(12) United States Patent
Rusciano et al.

(10) Patent No.: US 12,038,290 B2
(45) Date of Patent: Jul. 16, 2024

(54) REAL TIME ROUTING DURING HIGH-RISK ROAD USER ENCOUNTERS

(71) Applicant: GM Cruise Holdings LLC, San Francisco, CA (US)

(72) Inventors: Domenico Rusciano, Concord, CA (US); Jeffrey Brandon, Phoenix, AZ (US); Jonathan Scott Tang, South San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 120 days.

(21) Appl. No.: 17/841,779

(22) Filed: Jun. 16, 2022

(65) Prior Publication Data

US 2023/0408271 A1 Dec. 21, 2023

(51) Int. Cl.
*G01C 21/34* (2006.01)
*G08G 1/00* (2006.01)

(52) U.S. Cl.
CPC ..... *G01C 21/3461* (2013.01); *G01C 21/3415* (2013.01); *G01C 21/3492* (2013.01); *G08G 1/20* (2013.01); *G08G 1/22* (2013.01)

(58) Field of Classification Search
CPC ............ G01C 21/3461; G01C 21/3415; G08G 1/0112; G08G 1/202; B60W 30/16; B60W 40/00; B60W 60/0015; G05D 1/0022; G05D 1/0088; G07C 5/085; G07C 5/0808; G06Q 40/08; B60R 1/00
See application file for complete search history.

(56) References Cited

U.S. PATENT DOCUMENTS

| | | | |
|---|---|---|---|
| 11,112,794 B2 | 9/2021 | Chi-Johnston et al. | |
| 2017/0255966 A1* | 9/2017 | Khoury | B60W 40/00 |
| 2020/0348693 A1* | 11/2020 | Forney | G07C 5/085 |
| 2022/0365530 A1* | 11/2022 | Foster | G05D 1/0022 |
| 2022/0379924 A1* | 12/2022 | Foster | B60W 30/16 |
| 2023/0176587 A1* | 6/2023 | Forney | G05D 1/0088 |
| | | | 701/27 |
| 2023/0368673 A1* | 11/2023 | Rusciano | G08G 1/0112 |

FOREIGN PATENT DOCUMENTS

CA 2999498 C * 5/2020 ............... B60R 1/00

* cited by examiner

*Primary Examiner* — Yuri Kan

(57) ABSTRACT

Systems and methods for real time routing of vehicles. In particular, systems and methods are provided for real time routing of vehicles based on encounters with vulnerable road users. Vehicle perception and communication systems can provide live feedback of vulnerable road user locations. Various vulnerable road user behaviors can be identified by vehicle perception systems and flagged for avoidance in a central mapping system. The feedback can be used to route other fleet vehicles around the vulnerable road users.

20 Claims, 8 Drawing Sheets

100

REAL TIME ROUTING DURING HIGH-RISK ROAD USER ENCOUNTERS

FIELD OF THE DISCLOSURE

The present disclosure relates generally to autonomous vehicles (AVs) and to systems and methods for vehicle routing.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles can be part of an autonomous vehicle fleet that provides rides to users and/or picks up and delivers packages. Sometimes, there are areas in which the vehicles are operating that are preferably avoided. For instance, it may be preferable to avoid scenarios where emergency vehicles are gathering and blocking or narrowing the road. Similarly, it may be preferable to avoid areas where large crowds are gathered and spilling over onto the street.

SUMMARY

Systems and methods are provided for real time routing of vehicles. In particular, systems and methods are provided for real time routing of fleet vehicles based on encounters with vulnerable road user(s). Vehicle perception and communication systems can provide live feedback of vulnerable road user locations. Various vulnerable road user behaviors can be identified by vehicle perception systems and flagged for avoidance in a central mapping system. The feedback can be used by other fleet vehicles to avoid an encounter with the vulnerable road users.

According to one aspect, a method for vehicle routing in a fleet of vehicles, comprises: detecting, at a first vehicle, a road user; identifying, at a first vehicle perception system, a high-risk situation based on a behavior of the road user; logging a time, location, and type of the high-risk situation in a vehicle event log at the first vehicle; receiving the vehicle event log for the high-risk situation at a dispatch service; identifying a subset of vehicles in the fleet of vehicles with planned routes near the high-risk situation; and determining, for each vehicle in the subset of vehicles, a respective updated route.

In some implementations, determining the respective updated route includes identifying a respective alternate route including a detour around the high-risk situation. In some implementations, the method further includes communicating the respective updated route from the dispatch service to a corresponding respective vehicle in the subset of vehicles. In some implementations, the high-risk situation is moving and the location of the high-risk situation is changing, and wherein logging in the vehicle event log includes logging a direction of travel of the high-risk situation and a speed of travel of the high-risk situation. In some implementations, logging the high-risk situation includes logging a time window, wherein the vehicle event log expires at an end of the time window. In some implementations, the method further includes assigning, by the first vehicle perception system, a severity level to the high-risk situation. In some implementations, the method further includes transmitting the vehicle event log to a central computer and storing the vehicle event log in a mapping database. In some implementations, storing the vehicle event log in the mapping databased includes adding the high-risk situation to a map.

According to another aspect, a system for vehicle routing in a fleet of vehicles, comprises: a first vehicle in the fleet, including: a sensor suite including external vehicle sensors to sense a vulnerable road user and generate sensor data; a perception system to identify a high-risk situation based on the sensor data and generate a vehicle event log including a time, location and type of the high-risk situation; an onboard computer to transmit the vehicle event log; and a dispatch service to: receive the vehicle event log for the high-risk situation; identify a subset of vehicles in the fleet of vehicles having planned routes near the high-risk situation; and determine, for each vehicle in the subset of vehicles, a respective updated route.

In some implementations, the perception system is to identify the high-risk situation based on a behavior of the vulnerable road user. In some implementations, the high-risk situation is moving and the location of the high-risk situation is changing, and the vehicle event log includes a direction of travel of the high-risk situation and a speed of travel of the high-risk situation. In some implementations, the vehicle event log includes a time window, wherein the vehicle event log expires at an end of the time window. In some implementations, the perception system is to assign a severity level to the high-risk situation. In some implementations, the dispatch service Is further to determine the respective updated route by identifying a respective alternate route including a detour around the high-risk situation.

In some implementations, the dispatch service is further to communicate the respective updated route with a corresponding respective vehicle in the subset of vehicles. In some implementations, the system includes a mapping database including a map, wherein the high-risk situation is added to the map.

According to another aspect, a system for vehicle routing in a vehicle fleet, comprises: a plurality of vehicles, each vehicle including: a sensor suite including external vehicle sensors to sense a vulnerable road user and generate sensor data; a perception system to identify a high-risk situation based on the sensor data and generate a vehicle event log including a time, location and type of the high-risk situation; an onboard computer to transmit the vehicle event log; and a dispatch service to: receive a plurality of vehicle event logs, each for a respective high-risk situation encountered by a respective vehicle in a first subset of the plurality of vehicles; identify a second subset of the plurality of vehicles having planned routes near at least one of the respective high-risk situations; and determine, for each vehicle in the second subset of vehicles, a respective updated route, wherein the respective updated route includes at least one detour around at least one of the respective high-risk situations.

In some implementations, the system includes a mapping database including a map, wherein each of the respective high-risk situations is added to the map. In some implementations, the perception system in each of the plurality of vehicles is to identify the high-risk situation based on a behavior of the vulnerable road user. In some implementations, at least one of the respective high-risk situations is moving and a respective location of the respective high-risk situation is changing, and a corresponding vehicle event log for the respective high-risk situation includes a direction of travel of the respective high-risk situation and a speed of travel of the respective high-risk situation.

According to another aspect, a method for real time vehicle routing in a fleet of vehicles, comprises receiving a vehicle event log for a high-risk situation at a dispatch service, wherein the vehicle event log includes a time, location, and type of the high-risk situation; identifying a first vehicle in the fleet of vehicles having a planned route near the high-risk situation; identifying, for the first vehicle, a set of alternate routes including a detour around the high-risk situation; selecting, for the first vehicle, a respective updated route from the set of alternate routes.

In some implementations, receiving the vehicle event log includes receiving a severity rating for the high-risk situation. In some implementations, the high-risk situation is moving and the location of the high-risk situation is changing, and wherein receiving the vehicle event log includes receiving a direction of travel of the high-risk situation and a speed of travel of the high-risk situation. In some implementations, the method includes communicating the respective updated route from a dispatch service to the first vehicle.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for real time routing of vehicles. In particular, systems and methods are provided for real time routing of vehicles based on encounters with vulnerable or potentially vulnerable road user(s). Vehicle perception and communication systems can provide live feedback of vulnerable road user locations. Various vulnerable road user behaviors can be identified by vehicle perception systems and flagged as a high-risk situation for avoidance in a central mapping system. The feedback can be used by other fleet vehicles to avoid an encounter with the vulnerable road users.

While potentially hazardous situations associated with a vulnerable road user can be identified manually, the identification of these situations can also be automated using autonomous vehicle sensor and perception systems. A vulnerable road user can be an unprotected road user. In general, a vulnerable road user can include, for example, a pedestrian, a bicyclist, a skateboarder, or a scooter-rider, and autonomous vehicle sensor systems can recognize and identify various types of road users. In some examples, a vulnerable road user can act aggressively to a vehicle, to a vehicle passenger, and/or to others nearby. Vehicle perception systems can be used to identify an aggressive vulnerable road user at a selected location who is targeting vehicles or others. Similarly, vehicle perception systems can be used to identify a crowd of pedestrians, bicyclists, and/or skateboarders that may be difficult to navigate around.

In general, interactions with vulnerable road users have an increased likelihood of resulting in a high-risk event, and large groups of vulnerable road users can create elevated risks for autonomous vehicles, which can have difficulty navigating around a group. Once a vehicle perception system identifies a high-risk vulnerable road user situation, the location of the situation can be communicated with a central computer and/or with a routing coordinator, and other vehicles in the fleet can avoid the situation based on real time information.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle for Real Time Routing

Figure 1:
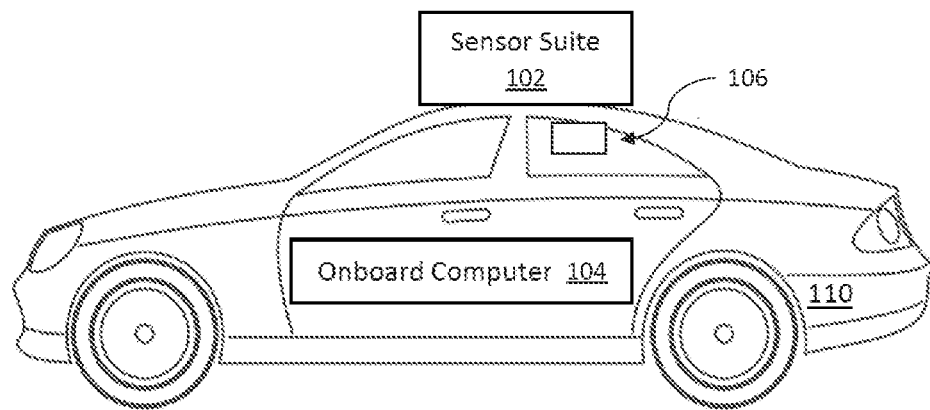
FIG. 1 is a diagram illustrating an autonomous vehicle, according to some embodiments of the disclosure.

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. In some examples, the autonomous vehicle 110 includes systems and methods for real time vehicle routing during vulnerable road user encounters. In some examples, the autonomous vehicle 110 includes systems and methods for identifying vulnerable road user behaviors and corresponding risky situations. In some examples, the autonomous vehicle 110 includes a perception system 106 that identifies vulnerable road users and identifies high-risk situations.

The perception system 106 can be in communication with and/or integrated with the onboard computer 104. The perception system uses sensor data to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from vehicle sensor systems, mapping and localization systems, a HD geospatial database, other components of the AV, and other data sources. The perception system 106 can detect and classify objects and determine their current and predicted locations, speeds, directions, and the like.

The sensor suite 102 includes localization and driving sensors. For example, the sensor suite may include one or more of photodetectors, cameras, radio detection and ranging (RADAR), sound navigation and ranging (SONAR), light detection and ranging (LIDAR), GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. As described in greater detail below, information about the autonomous vehicle's environment as detected by the sensor suite 102 can be logged in a vehicle sensor log, which can be used to generate a vehicle event log as provided herein. In particular, the sensor suite 102 can be used to identify vulnerable road users and determine various factors regarding an autonomous vehicle's environment. Vehicle perception systems can use the sensor suite 102 data and identify high-risk situations associated with identified vulnerable road users. In some examples, data from the sensor suite 102 can be used to update a map with information used to develop layers with waypoints identifying various detected items. In some examples, data from the sensor suite 102 can include information regarding crowds and/or lines outside and/or around selected venues. Similarly, the high-risk situations associated with vulnerable road users can be added to a map along with a time the high-risk situation was identified. Additionally, sensor suite 102 data can provide localized traffic information. In this way, sensor suite 102 data from many autonomous vehicles can continually provide feedback to the mapping system and the high fidelity map can be updated as more and more information is gathered, with information changing over time.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, a vehicle event log receives and stores processed sensed sensor suite 102 data from the onboard computer 104. In some examples, a vehicle sensor log receives sensor suite 102 data from the sensor suite 102. In some examples, the onboard computer 104 generates a vehicle event log based on the vehicle sensor log. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Real Time Routing of Vehicles

Figure 2:
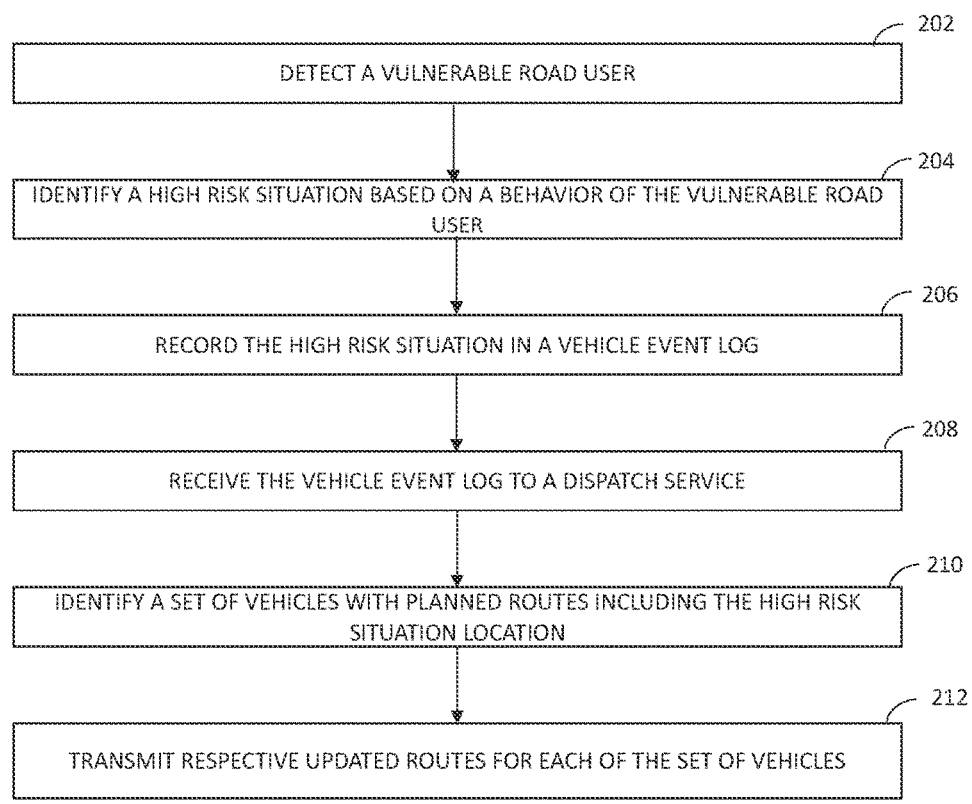
FIG. 2 is a diagram illustrating a method for real time routing of vehicles, according to some embodiments of the disclosure.

FIG. 2 is a diagram illustrating a method 200 for real time routing of vehicles, according to some embodiments of the disclosure. In particular, vehicles can be routed (or re-routed) in real time based on an identified high-risk situation. According to various examples, the method 200 begins at step 202, when a vehicle detects a vulnerable road user. As described above, a vulnerable road user can include, for example, a pedestrian, a bicyclist, a skateboarder, a scooter-rider, a skater, a person on horseback, and/or a person operating a wheelchair or other mobility device. In some examples, a vulnerable road user is a road user that is unprotected by an outside shield who may sustain a greater risk of injury in a collision. In some examples, vulnerable road users include motorcycle operators.

At step 204, a high-risk situation is identified based on a behavior of the vulnerable road user. In particular, a vehicle perception system can evaluate the vulnerable road user behavior and identify the presence of a high-risk situation. In some examples, a high-risk situation includes a large group of vulnerable road users. For instance, a crowd of pedestrians exiting a venue. When there are crowds of people, some pedestrians may walk on roadways, increasing the risk of an incident. In another example, the large group can be a group of bicyclists or skateboarders traveling together on a roadway. While other vehicles can drive around these groups, there remains a higher risk of an incident, especially because one or more bicyclists or skateboarders could fall and unexpectedly end up in a vehicle's path. In other examples, groups of riders (bicyclists, skateboards, etc.) may block traffic at an intersection.

In some examples, a high-risk situation can be a single pedestrian and/or jaywalker standing in the road for an extended period of time. In some examples, a high-risk situation can include a pedestrian acting erratically on a walkway, and/or a location where one or more pedestrians move off the walkway on to the roadway, e.g., to avoid something on the walkway. In some examples, an unwanted public interaction, such as one or more pedestrians yelling, shouting, and/or swearing is considered a high-risk situation. In some examples, directional microphones on the vehicle can be used to determine whether pedestrian yelling, shouting, swearing, etc., is directed at the vehicle or elsewhere. In some examples, a high-risk situation includes a person throwing something at a vehicle or otherwise interacting with a vehicle in an unwelcome manner. Similarly, vehicle sensor can identify that a person is carrying a weapon or other dangerous object and identify a high-risk situation. In some examples, an unwanted person attempting to gain access to a vehicle is identified as a high-risk situation. In various examples, machine learning can be used by vehicles in a fleet to learn which pedestrian behaviors are normal and/or typical versus which behaviors are erratic, abnormal, and/or concerning. In some examples, machine learning models can detect whether there is high confidence that the road user is behaving abnormally (e.g., not following a usual pattern). The machine learning model can use a classification technique or a probability output. For instance, machine learning models can be trained to classify typical and atypical classes of behaviors. In another example, a machine learning model output indicates that there is low confidence or low probability that the road user is behaving typically (e.g., the probability that the road user behavior belongs to a normal/typical behavior class is below a threshold). In some examples, a high-risk situation can be an area where vulnerable road users (e.g., scooters and/or skateboarders) are detected riding through an intersection and ignoring stop signs or traffic lights.

In various examples, vehicle sensors, such as the vehicle sensor suite and/or other external sensors, can be used to detect various activities and situations around the vehicle. The sensors are described above with respect to FIG. 1. A vehicle perception system can be used to identify high-risk situations.

At step 206, the type of high-risk situation, the location and/or geofenced area of the high-risk situation, and the time the high-risk situation was encountered, are recorded in a vehicle event log. In some examples, the size of a geofence for a geofenced area of a high-risk situation can depend on the severity of the situation (e.g., a higher severity level may result in a larger geofenced area, while a lower severity level may result in a smaller geofenced area). In some examples, if the high-risk situation is moving, such as a group of bicyclists, the direction of travel and/or the speed of travel of the group is recorded in the vehicle event log. In some examples, a severity level of the high-risk situation is recorded. For instance, an index score can be given to a high-risk situation based on the severity level, with a higher index score indicating increased risk and/or severity of the situation. In some examples, the type of high-risk situation is associated with a time window for the high-risk situation. For instance, a moving group of bicyclists will only be in a certain location for a short time window. In contrast, an intersection where skateboarders are frequently detected blowing through a stop sign can be a more long-term high-risk situation location. In some examples, an expiration time is associated with the high-risk situation. In some examples, the high-risk situation is associated with a time period in which the severity of the situation gradually decreases over the time window.

At step 208, the vehicle event log is received at a dispatch service. In some examples, the vehicle transmits its vehicle event log to the dispatch service when it records a high-risk situation. In some examples, the vehicle transmits its vehicle event log to a central computer, which processes and stores vehicle events received from various vehicles in a fleet of vehicles, and the central computer transmits vehicle event logs to the dispatch service. In some examples, the central computer adds high-risk situations to a central mapping system.

At step 210, the dispatch service identifies a set of vehicles with planned routes that include and/or pass by the location of the high-risk situation. In examples where the high-risk situation is moving, the set of vehicles identified by the dispatch service includes vehicles with planned routes that include and/or pass by a location where the high-risk situation is predicted to be at about the same time as the vehicle. Once the set of vehicles is identified, the respective route for each of the set of vehicles is updated to avoid the high-risk situation. In some examples, a route can be scored based on various index scores for various high-risk situations, and the route with the lowest score can be selected. In some examples, the index score can be weighed against other factors such as distance the destination and/or time to the destination. Thus, in some examples, a vehicle route can be optimized based on various considerations.

At step 212, the dispatch service transmits a respective updated route to each of the set of vehicles. In particular, the dispatch service transmits respective updated routes that do not include the high-risk situation location. When possible, the vehicles in the set of vehicles are routed around the high-risk situation. In some examples, the high-risk situation is given a rating, and the difficulty of routing around the high-risk situation (and/or the increased length of the route and/or the increased time to arrival at the route destination) is compared to the rating to determine whether to route around the high-risk situation.

In some examples, the vehicle event log is based on sensor data. Sensor data can be recorded in a sensor log on a vehicle. In various examples, vehicle sensor data is continuously and/or periodically stored and/or updated in a sensor log on the vehicle. Sensor data can include vehicle location, vehicle direction of travel, number of passengers in the vehicle, surrounding traffic conditions, presence of vulnerable road users, road conditions, weather conditions, visibility, as well as data such as vehicle speed, mileage, tire pressure, battery charge, engine conditions, temperatures (outside, interior cabin, battery, engine, etc.), and sensor data indicating any external contact with the vehicle. In some examples, the vehicle periodically updates this information, such as every second, every five seconds, or any time there is any change to the vehicle (e.g., the vehicle is moved, bumped, etc.).

In some examples, third party information can be used to update vulnerable road user information. For instance, a third-party heat map can be used to identify densely occupied areas. In some examples, a Strava heat map can be used. Similarly, some mapping services provide live visualization maps of various areas, and these maps can be used to identify densely occupied areas. In some examples, a central computer has information about scheduled events around a city, and the information about the scheduled events is used to define avoidance areas. In some examples, densely occupied areas can be defined and labeled as avoidance areas in a vehicle mapping system, such that vehicle routes avoid the avoidance areas.

In some examples, when a vehicle encounters a high-risk situation and vehicle perception systems identify the high-risk situation, the vehicle can communicate the presence and location of the high-risk situation directly to nearby vehicles.

In various examples, a central computer and/or dispatch service user vehicle event logs to map data, and to guide other autonomous vehicles away from a high-risk situation. According to various implementations, map data includes high precision map data. In some examples, high precision maps include layers of information in addition to roadway maps and can be used for routing and directing autonomous vehicles. The layers of information can include data about objects visible from roadways, such as buildings, landmarks, signs, traffic lights, hydrants, roadwork, parked vehicles, etc. The layers of information can also include, for example, expected traffic patterns and/or traffic density at various times of day and on various days of the week. When autonomous vehicles travel around an area, the autonomous vehicles record and provide feedback on the surrounding environment to a central computer. The high precision map is updated to include current environment data, and the updated high precision map can be used by other autonomous vehicles. Autonomous vehicles can also record and provide feedback on events that are encountered, such as roadwork, including where and when the events are encountered. The high precision maps can include a layer marking waypoints for various events. Data analysis from previous autonomous vehicle routes can also determine timeframes during which selected events are more likely to occur in selected locations and these locations and times can be avoided to avoid congestion.

Example System for Real Time Routing

Figure 3:
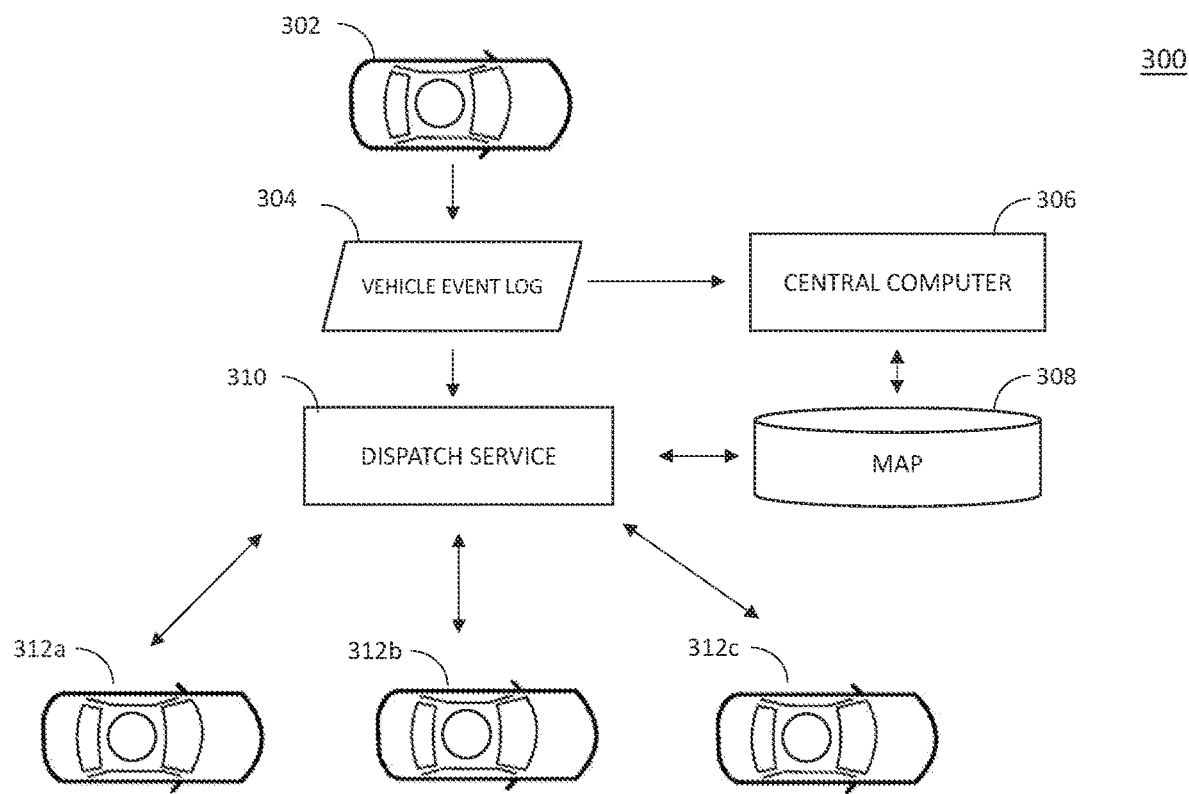
FIG. 3 is a diagram illustrating a system for real time routing using a vehicle event log, according to some embodiments of the disclosure.

FIG. 3 is a diagram illustrating a system for real time routing using a vehicle event log, according to some embodiments of the disclosure. FIG. 3 is an example in which a first fleet vehicle 302 is encounters a high-risk situation (as described above with respect to FIG. 2) and generates a vehicle event log 304. The first fleet vehicle 302 transmits the vehicle event log 304 to at least one of a central computer 306 and a dispatch service 310. In some examples, the vehicle event log 304 is transmitted to both the central computer 306 and the dispatch service. The central computer 306 can use the vehicle event log to update a map database 308.

The dispatch service 310 can use the vehicle event log to identify other fleet vehicles 312*a*, 312*b*, 312*c* that have routes including the location of the high-risk situation. In some examples, the high-risk situation location changes with time (e.g., a group of bicyclists riding down a road), and the dispatch service 310 uses the vehicle event log information (e.g., time, location of the vulnerable road users, speed of the vulnerable road users) to determine expected locations of the high-risk situation (i.e., the vulnerable road users) at specific times. The dispatch service 310 uses this information to identify the other fleet vehicles 312*a*, 312*b*, 312*c*, by identifying vehicles 312*a*, 312*b*, 312*c* whose routes and route timing indicate the vehicles 312*a*, 312*b*, 312*c* are likely to encounter the high-risk situation. The dispatch service then generates alternative routes for each of the vehicles 312*a*, 312*b*, 312*c*.

In some examples, the high-risk situation includes a risk level and/or severity level. The alternative routes generated by the dispatch service 310 can include a score based on various events expected to be encountered along the route, as well as the distance of the route and the time to destination of the route. The alternative routes can be ranked according to this score to select a route for each of the vehicles 312*a*, 312*b*, 312*c*. The respective alternative routes are communicated from the dispatch service 310 to the respective vehicles 312*a*, 312*b*, 312*c*.

Example Diagrams of Events and Real Time Routing

Figure 4:
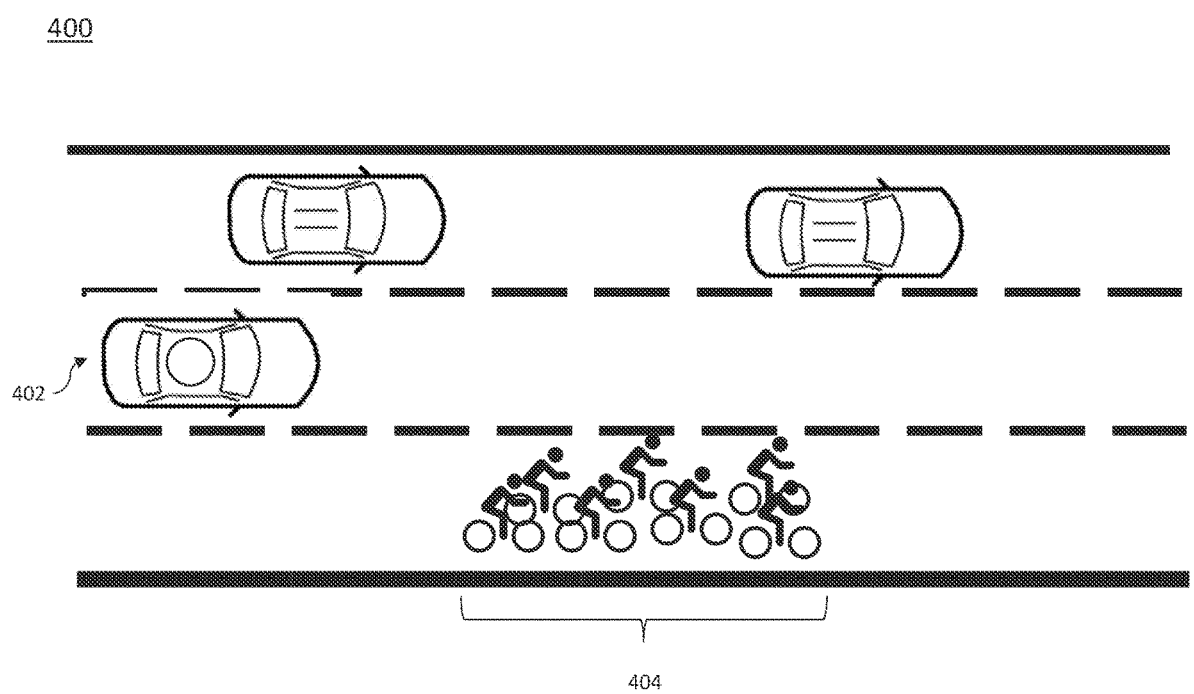
FIG. 4 is a diagram illustrating a group of vulnerable road users and a high-risk situation, according to some embodiments of the disclosure.

FIG. 4 is a diagram illustrating a group of vulnerable road users and a high-risk situation, according to various embodiments of the disclosure. In particular, FIG. 4 illustrates a vehicle 402 that detects a group of vulnerable road users 404. In particular, vehicle 402 sensors detect the group of vulnerable road users 404 as a group of bicyclists. A vehicle 402 perception system determines that the group of bicyclists creates a high-risk situation for the vehicle 402. In particular, the vehicle 402 is to drive by the bicyclists, and if any of the bicyclists falls or veers into the lane the vehicle 402 is traveling in, it could result in a high injury event, since the bicyclist could then be injured by the vehicle 402. Thus, the vehicle 402 generates a vehicle event log for the high-risk situation including the time, a location (e.g., a geofenced area) of the group of bicyclists (the group of vulnerable road users 404), the speed of travel of the group of bicyclists 404, and the direction of travel of the group of bicyclists 404. The vehicle event log can also include any other selected information sensed by the vehicle sensors such as the size of the group of bicyclists, road conditions, and weather conditions. As described above, the vehicle 402 transmits the vehicle event log to a dispatch service and/or to a central computer, and the routes of other fleet vehicles can then be updated to avoid the group of bicyclists 404.

Figure 5:
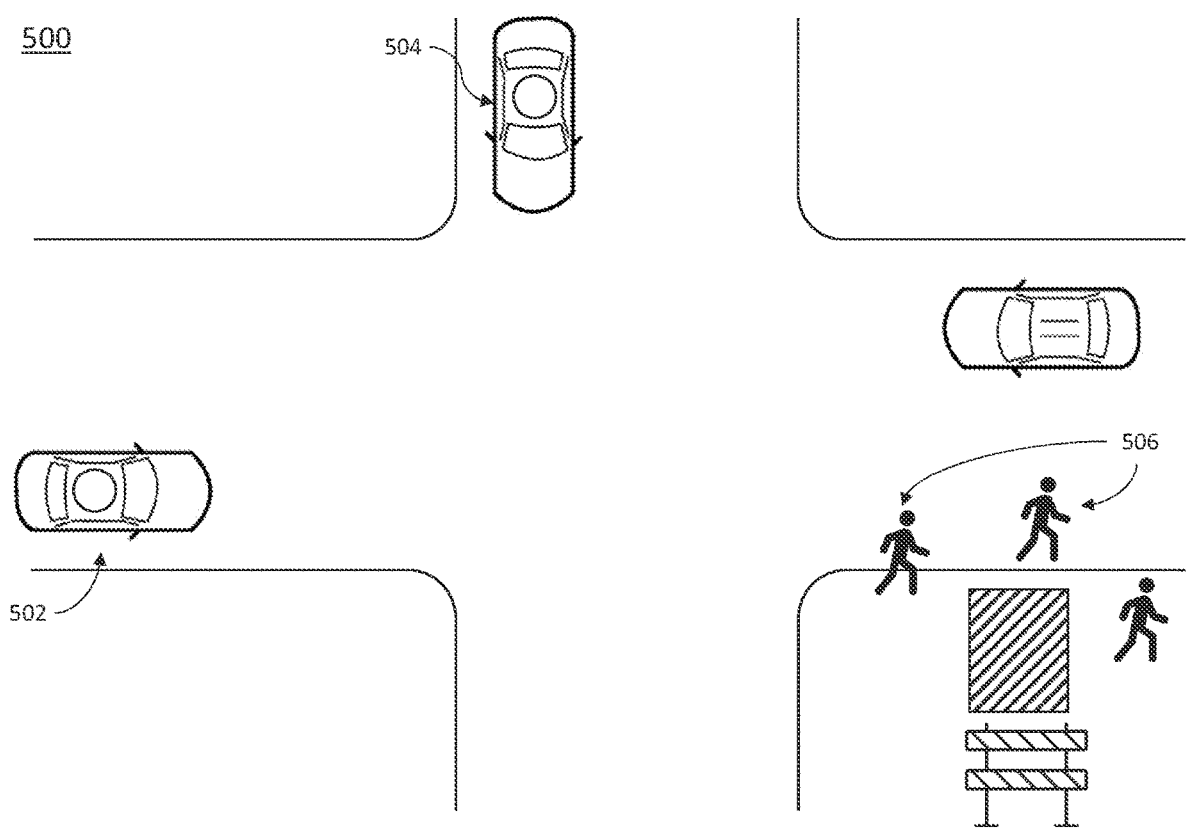
FIG. 5 is a diagram illustrating a high-risk situation, according to some embodiments of the disclosure.

FIG. 5 is a diagram 500 illustrating a high-risk situation, according to various embodiments of the disclosure. In particular, FIG. 5 illustrates an example in which one or more pedestrians 506 are walking on the roadway, in a lane of traffic where vehicles drive. As shown in FIG. 5, the pedestrians are walking in the lane of traffic to get around a barricade in the pedestrian walkway. The severity level of the high-risk situation presented in FIG. 5 may depend on the general number of pedestrians on the walkway, and thus the number of pedestrians who are likely to walk on the road. In some examples, there may be very few pedestrians around, and thus, the severity level may be low, while in other examples, there may be many pedestrians and the severity level may be high.

At least one of the vehicles 502, 504 detects the group of vulnerable road users, the pedestrians 506. In particular, sensors on the vehicles 502, 504 detect the pedestrians 506. A vehicle perception system determines that the pedestrians are walking in the roadway and create a high-risk situation for the vehicles 502, 504. In particular, assuming the vehicles 502, 504 are routed along the right-hand road in the FIG. 5, the vehicles 502, 504 will drive by the pedestrians 506, and if any pedestrians move into the road the vehicles 502, 504 are traveling in, it could result in a high injury event, since the pedestrian could then be injured by the vehicle vehicles 502, 504. Thus, the vehicles 502, 504 generate a vehicle event log for the high-risk situation including the time and the location of the high-risk situation. In some examples, the location of the high-risk situation in FIG. 5 does not change, since it is created by a barrier in the walkway. As described above, the vehicles 502, 504 transmit their respective vehicle event logs to a dispatch service and/or to a central computer, and the routes of other fleet vehicles can then be updated to avoid the high-risk situation.

Example of Autonomous Vehicle Fleet for Real Time Routing

Figure 6:
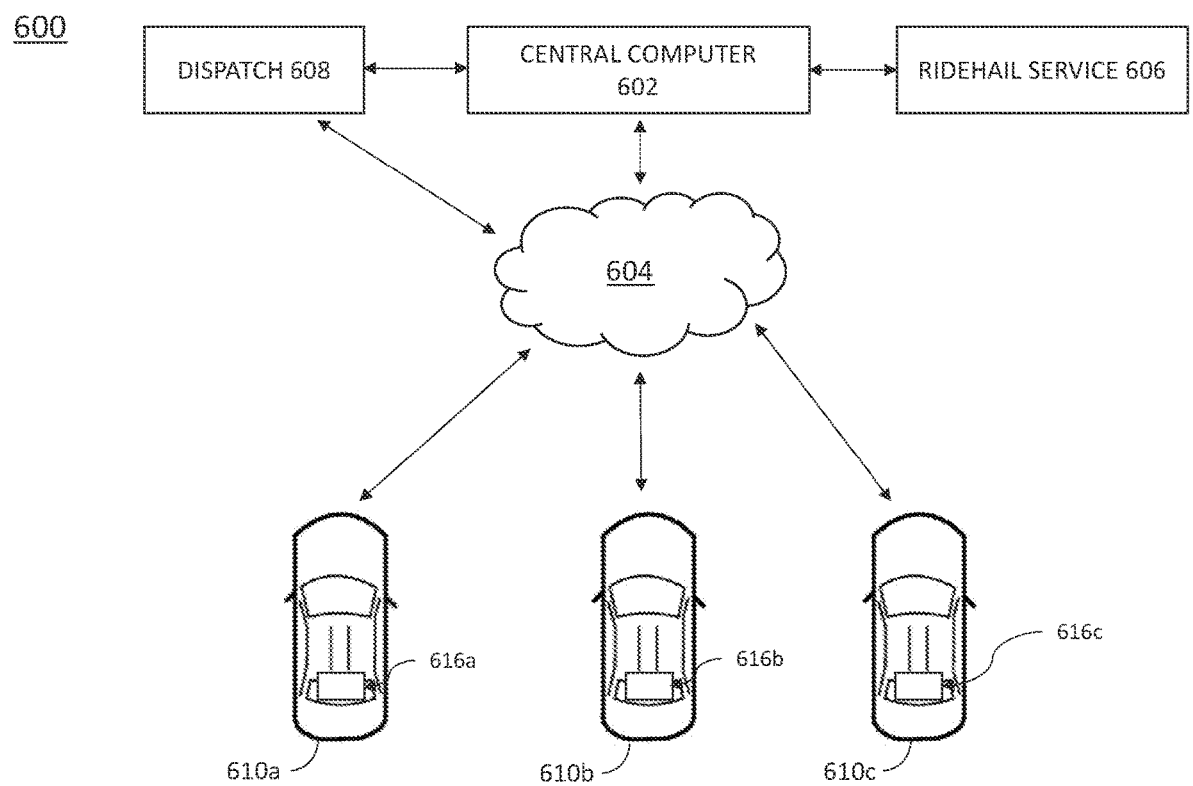
FIG. 6 is a diagram illustrating a fleet of autonomous vehicles in communication with a central computer, according to some embodiments of the disclosure.

FIG. 6 is a diagram 600 illustrating a fleet of autonomous vehicles 610a, 610b, 610c in communication with a central computer 602, according to some embodiments of the disclosure. The vehicles 610a-610c communicate wirelessly with a cloud 604 and a central computer 602. The central computer 602 includes a routing coordinator and a database of information from the vehicles 610a-610c in the fleet. Autonomous vehicle fleet routing refers to the routing of multiple vehicles in a fleet. The central computer also acts as a centralized ride management system and communicates with ridehail users via a ridehail service 606. Via the ridehail service 606, the central computer receives ride requests from various user ridehail applications. Additionally, the central computer communicates with a dispatch service 608. In some implementations, the autonomous vehicles 610a-610c communicate with the dispatch service 608. In some implementations, the autonomous vehicles 610a-610c communicate directly with each other. The autonomous vehicles 610a-610c each include a vehicle perception system 616a, 616b, 616c as described above with respect to the vehicle perception system 106 of FIG. 1.

When a ride request is entered at a ridehail service 606, the ridehail service 606 sends the request to the central computer 602. If the ridehail request is for a future date, the central computer 602 stores the information for future routing determinations. In some examples, on the day of the ride request, during a selected period of time before the ride begins, the vehicle to fulfill the request is selected and route for the vehicle is generated by the routing coordinator. In other examples, the vehicle to fulfill the request is selected and the route for the vehicle is generated by the onboard computer on the autonomous vehicle. In various examples, information pertaining to the ride Is transmitted to the selected vehicle 610a-610c. With shared rides, the route for the vehicle can depend on other passenger pick-up and drop-off locations. Each of the autonomous vehicles 610a, 610b, 610c in the fleet record sensor data in a vehicle sensor log. In some examples, each of the autonomous vehicles 610a, 610b, 610c in the fleet includes a perception system 616a, 616b, 616c, which can generate a vehicle event log from its respective vehicle sensor log in the event the vehicle encounters a high-risk situation. The vehicles 610a, 610b, 610c communicate with the central computer 602 via the cloud 604. Similarly, the vehicles 610a, 610b, 610c communicate with the dispatch service 608 via the cloud 604.

As described above, each vehicle 610a-610c in the fleet of vehicles communicates with a routing coordinator. Thus, information gathered by various autonomous vehicles 610a-610c in the fleet can be saved and used to generate information for future routing determinations. For example, sensor data can be used to generate route determination parameters. In general, the information collected from the vehicles in the fleet can be used for route generation or to modify existing routes. In particular, routes can be modified based on a vehicle event log received from another vehicle. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns. Similarly, in some examples, the routing coordinator uses collected position data corresponding to high-risk situations to generate a best route for an autonomous vehicle to avoid a high-risk situation and associated unknowns.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computer 602 generates a route for each selected autonomous vehicle 610a-610c, and the routing coordinator determines a route for the autonomous vehicle 610a-610c to travel from the autonomous vehicle's current location to a first destination.

Example of a Computing System for Real Time Routing

Figure 7:
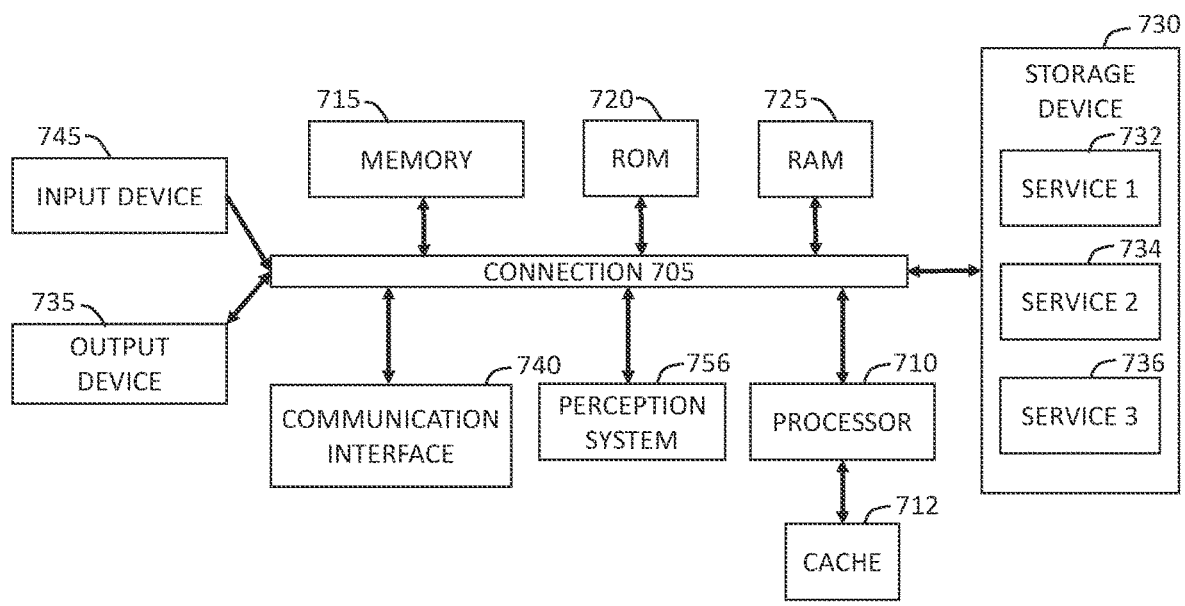
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computer 602, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. In some examples, the services 732, 734, 736 can include a neural network, a machine learning module, a perception system, and/or a real-time routing component. The processor 710 may essentially be a completely self-contained computing system, containing multiple cores or processors, a bus, memory controller, cache, etc. A multi-core processor may be symmetric or asymmetric.

The computing system 700 includes a perception system 756 to analyze input, for example input from vehicle sensors, and identify vulnerable road users and high-risk situations. The perception system 756 can evaluate data from a vehicle sensor log that stores vehicle sensor data. The sensor data from the vehicle sensor log can be transmitted via the connection 705 to other components of the computing system 700. In other examples, sensor data is stored in another location such as in memory 715 and/or in a storage device 730. Sensor data can change frequently as a vehicle drives and its environment changes, and thus the vehicle sensor log can also be frequently updated. The perception system 756 can access current vehicle sensor data via the connection 705, and can generate a vehicle event log. The vehicle event log can be communicated, e.g., with a dispatch service and/or a central computer, via the communication interface 740.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROMs, and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server, or a distributed computing system connected to the autonomous vehicles via an Internet connection. In some implementations, the routing coordinator is any suitable computing system. In some examples, the routing coordinator is a collection of autonomous vehicle computers working as a distributed system.

Example Machine Learning Model for Real Time Routing

Figure 8:
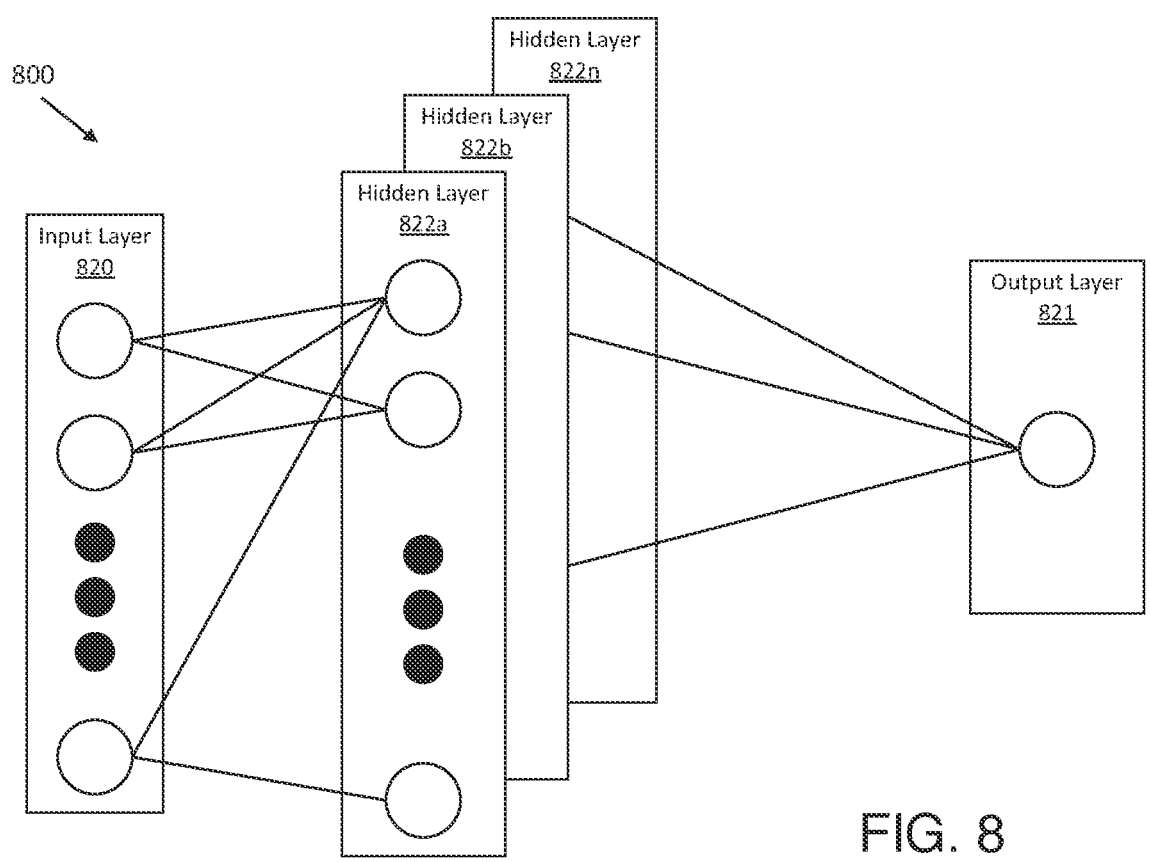
FIG. 8 illustrates an example system environment that can be used to facilitate autonomous vehicle (AV) dispatch and operations, according to some aspects of the disclosed technology.

In FIG. 8, the disclosure now turns to a further discussion of models that can be used through the environments and techniques described herein. Specifically, FIG. 8 is an illustrative example of a deep learning neural network 800 that can be used to implement all, or a portion of a perception module (or perception system) as discussed above. An input layer 820 can be configured to receive sensor data and/or data relating to an environment surrounding an AV. The neural network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The neural network 800 further includes an output layer 821 that provides an output resulting from the processing performed by the hidden layers 822a, 822b, through 822n. In one illustrative example, the output layer 821 can provide estimated treatment parameters, that can be used/ingested by a differential simulator to estimate a patient treatment outcome.

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the first hidden layer 822a can transform the information of each input node by applying activation functions to the input node information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 821, at which an output is provided. In some cases, while nodes in the neural network 800 are shown as having multiple output lines, a node can have a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 821.

In some cases, the neural network 800 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 800 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 800 can perform a backward pass by determining which inputs (weights) most contributed to the loss of the network, and can adjust the weights so that the loss decreases and is eventually minimized.

The neural network 800 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 800 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for vehicle routing in a fleet of vehicles, comprising: detecting, at a first vehicle, a vulnerable road user; identifying, at a first vehicle perception system, a high-risk situation based on a behavior of the vulnerable road user; logging a time, location, and type of the high-risk situation in a vehicle event log at the first vehicle; receiving the vehicle event log for the high-risk situation at a dispatch service; identifying a subset of vehicles in the fleet of vehicles with planned routes near the high-risk situation; and determining, for each vehicle in the subset of vehicles, a respective updated route.

Example 2 provides a method, system, and/or vehicle according to one or more of the preceding and/or following examples, wherein determining the respective updated route includes identifying a respective alternate route including a detour around the high-risk situation.

Example 3 provides a method, system, and/or vehicle according to one or more of the preceding and/or following examples, further comprising communicating the respective updated route from the dispatch service to a corresponding respective vehicle in the subset of vehicles.

Example 4 provides a method, system, and/or vehicle according to one or more of the preceding and/or following examples, wherein the high-risk situation is moving, and the location of the high-risk situation is changing, and wherein logging in the vehicle event log includes logging a direction of travel of the high-risk situation and a speed of travel of the high-risk situation.

Example 5 provides a method, system, and/or vehicle according to one or more of the preceding and/or following examples, wherein logging the high-risk situation includes logging a time window, wherein the vehicle event log expires at an end of the time window.

Example 6 provides a method, system, and/or vehicle according to one or more of the preceding and/or following examples, further comprising assigning, by the first vehicle perception system, a severity level to the high-risk situation.

Example 7 provides a method, system, and/or vehicle according to one or more of the preceding and/or following examples, further comprising transmitting the vehicle event log to a central computer and storing the vehicle event log in a mapping database.

Example 8 provides a method, system, and/or vehicle according to one or more of the preceding and/or following examples, wherein storing the vehicle event log in the mapping databased includes adding the high-risk situation to a map.

Example 9 provides a system for vehicle routing in a fleet of vehicles, comprising: a first vehicle in the fleet, including: a sensor suite including external vehicle sensors to sense a vulnerable road user and generate sensor data; a perception system to identify a high-risk situation based on the sensor data and generate a vehicle event log including a time, location and type of the high-risk situation; an onboard computer to transmit the vehicle event log; and a dispatch service to: receive the vehicle event log for the high-risk situation; identify a subset of vehicles in the fleet of vehicles having planned routes near the high-risk situation; and determine, for each vehicle in the subset of vehicles, a respective updated route.

Example 10 provides a method, system, and/or vehicle according to one or more of the preceding and/or following examples, wherein the perception system is to identify the high-risk situation based on a behavior of the vulnerable road user.

Example 11 provides a method, system, and/or vehicle according to one or more of the preceding and/or following examples, wherein the high-risk situation is moving, and the location of the high-risk situation is changing, and the vehicle event log includes a direction of travel of the high-risk situation and a speed of travel of the high-risk situation.

Example 12 provides a method, system, and/or vehicle according to one or more of the preceding and/or following examples, wherein the vehicle event log includes a time window, wherein the vehicle event log expires at an end of the time window.

Example 13 provides a method, system, and/or vehicle according to one or more of the preceding and/or following examples, wherein the perception system is to assign a severity level to the high-risk situation.

Example 14 provides a method, system, and/or vehicle according to one or more of the preceding and/or following examples, wherein the dispatch service Is further to determine the respective updated route by identifying a respective alternate route including a detour around the high-risk situation.

Example 15 provides a method, system, and/or vehicle according to one or more of the preceding and/or following examples, wherein the dispatch service is further to communicate the respective updated route with a corresponding respective vehicle in the subset of vehicles.

Example 16 provides a method, system, and/or vehicle according to one or more of the preceding and/or following examples, further comprising a mapping database including a map, wherein the high-risk situation is added to the map.

Example 17 provides a system for vehicle routing in a vehicle fleet, comprising: a plurality of vehicles, each vehicle including: a sensor suite including external vehicle sensors to sense a vulnerable road user and generate sensor data; a perception system to identify a high-risk situation based on the sensor data and generate a vehicle event log including a time, location and type of the high-risk situation; an onboard computer to transmit the vehicle event log; and a dispatch service to: receive a plurality of vehicle event logs, each for a respective high-risk situation encountered by a respective vehicle in a first subset of the plurality of vehicles; identify a second subset of the plurality of vehicles having planned routes near at least one of the respective high-risk situations; and determine, for each vehicle in the second subset of vehicles, a respective updated route, wherein the respective updated route includes at least one detour around at least one of the respective high-risk situations.

Example 18 provides a method, system, and/or vehicle according to one or more of the preceding and/or following examples, further comprising a mapping database including a map, wherein each of the respective high-risk situations is added to the map.

Example 19 provides a method, system, and/or vehicle according to one or more of the preceding and/or following examples, wherein the perception system in each of the plurality of vehicles is to identify the high-risk situation based on a behavior of the vulnerable road user.

Example 20 provides a method, system, and/or vehicle according to one or more of the preceding and/or following examples, wherein at least one of the respective high-risk situations is moving and a respective location of the respective high-risk situation is changing, and a corresponding vehicle event log for the respective high-risk situation includes a direction of travel of the respective high-risk situation and a speed of travel of the respective high-risk situation.

Example 21 provides a method for real time vehicle routing in a fleet of vehicles, comprising receiving a vehicle event log for a high-risk situation at a dispatch service, wherein the vehicle event log includes a time, location, and type of the high-risk situation; identifying a first vehicle in the fleet of vehicles having a planned route near the high-risk situation; identifying, for the first vehicle, a set of alternate routes including a detour around the high-risk situation; selecting, for the first vehicle, a respective updated route from the set of alternate routes.

Example 21 provides a method, system, and/or vehicle according to one or more of the preceding and/or following examples, wherein receiving the vehicle event log includes receiving a severity rating for the high-risk situation.

Example 22 provides a method, system, and/or vehicle according to one or more of the preceding and/or following examples, wherein the high-risk situation is moving, and the location of the high-risk situation is changing, and wherein receiving the vehicle event log includes receiving a direction of travel of the high-risk situation and a speed of travel of the high-risk situation.

Example 23 provides a method, system, and/or vehicle according to one or more of the preceding and/or following examples, further comprising communicating the respective updated route from a dispatch service to the first vehicle.

Example 24 provides a method, system, and/or vehicle according to one or more of the preceding and/or following examples, wherein identifying the high-risk situation based on the behavior of the road user comprises identifying, by a machine learning model, an atypical road user behavior using one of a classification technique and a probability output.

Example 25 provides a method, system, and/or vehicle according to one or more of the preceding and/or following examples, wherein the classification technique comprises classifying, by the machine learning model, typical and atypical classes of behavior.

Example 26 provides a method, system, and/or vehicle according to one or more of the preceding and/or following examples, wherein the probability output comprises determining, by the machine learning model, that there is a low probability that the road user is behaving typically.

Example 27 provides a method, system, and/or vehicle according to one or more of the preceding and/or following examples, wherein the probability output comprises determining, by the machine learning model, that a probability that the behavior of the road user belongs to a typical behavior class is below a threshold.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, or one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for vehicle routing in a fleet of vehicles, comprising:
    detecting, at a first vehicle, a road user, the road user including at least one pedestrian;
    identifying, at a first vehicle perception system, a high-risk situation based on a behavior of the road user, including identifying, by a machine learning model, an aggressive behavior to the first vehicle;
    logging a time, location, and type of the high-risk situation in a vehicle event log at the first vehicle;
    assigning, by the first vehicle perception system, a severity level to the high-risk situation based on the behavior, wherein the severity level decreases over a time window associated with the high-risk situation;
    transmitting the vehicle event log for the high-risk situation to a dispatch service;
    identifying a subset of vehicles in the fleet of vehicles with planned routes near the high-risk situation;
    determining, for each vehicle in the subset of vehicles, a respective updated route; and
    causing an onboard computer of a respective vehicle in the subset of vehicles to navigate the respective vehicle along the respective updated route.

2. The method of claim 1, wherein determining the respective updated route includes identifying a respective alternate route including a detour around the high-risk situation.

3. The method of claim 2, further comprising communicating the respective updated route from the dispatch service to a corresponding respective vehicle in the subset of vehicles.

4. The method of claim 1, wherein the high-risk situation is moving and the location of the high-risk situation is changing, and wherein logging in the vehicle event log includes logging a direction of travel of the high-risk situation and a speed of travel of the high-risk situation.

5. The method of claim 4, wherein logging the high-risk situation includes logging the time window, wherein the logged high-risk situation expires at an end of the time window.

6. The method of claim 1, wherein identifying the subset of vehicles in the fleet of vehicles with planned routes near the high-risk situation is based on a geofenced area of the high-risk situation, wherein the geofenced area depends on the severity level.

7. The method of claim 1, further comprising transmitting the vehicle event log to a central computer and storing the vehicle event log in a mapping database, wherein storing the vehicle event log in the mapping database includes adding the high-risk situation to a map.

8. The method of claim 1, wherein identifying the high-risk situation based on the behavior of the road user comprises identifying, by the machine learning model, the aggressive behavior using one of a classification technique and a probability output, trained using the fleet of vehicles.

9. A system for vehicle routing in a fleet of vehicles, comprising:
    a first vehicle in the fleet, including:
        a sensor suite including external vehicle sensors to sense a vulnerable road user and generate sensor data;
        a perception system to identify a high-risk situation based on the sensor data indicative of an aggressive behavior of the vulnerable road user to the first vehicle, to generate a vehicle event log including a time, a location and a type of the high-risk situation, and to assign a severity level to the high-risk situation based on the behavior, wherein the severity level decreases over a time window associated with the high-risk situation;
an onboard computer to transmit the vehicle event log; and
a dispatch service to:
receive the vehicle event log for the high-risk situation;
identify a subset of vehicles in the fleet of vehicles having planned routes near the high-risk situation; and
determine, for each vehicle in the subset of vehicles, a respective updated route; and
cause an onboard computer of a respective vehicle in the subset of vehicles to navigate the respective vehicle along the respective updated route.

10. The system of claim 9, wherein the perception system is to identify the high-risk situation based on a behavior of the vulnerable road user.

11. The system of claim 10, wherein the high-risk situation is moving and the location of the high-risk situation is changing, and the vehicle event log includes a direction of travel of the high-risk situation and a speed of travel of the high-risk situation.

12. The system of claim 9, wherein the vehicle event log includes the time window, wherein the vehicle event log expires at an end of the time window.

13. The system of claim 9, wherein the identified subset of vehicles in the fleet of vehicles having planned routes near the high-risk situation is based on a geofenced area of the high-risk situation, wherein the geofenced area depends on the severity level.

14. The system of claim 9, wherein the dispatch service Is further to determine the respective updated route by identifying a respective alternate route including a detour around the high-risk situation.

15. The system of claim 14, wherein the dispatch service is further to communicate the respective updated route with the corresponding respective vehicle in the subset of vehicles.

16. The system of claim 9, further comprising a mapping database including a map, wherein the high-risk situation is added to the map.

17. A method for real time vehicle routing in a fleet of vehicles, comprising:
receiving a vehicle event log for a high-risk situation at a dispatch service, wherein the vehicle event log includes a time, a location, type, a time window, and a severity level of the high-risk situation, wherein the severity level is based on an aggressive behavior of a pedestrian and wherein the severity level decreases over the time window;
identifying a first vehicle in the fleet of vehicles having a planned route near the high-risk situation during the time window;
identifying, for the first vehicle, a set of alternate routes including a detour around the high-risk situation; and
selecting, for the first vehicle, a respective updated route from the set of alternate routes; and
causing an onboard computer of the first vehicle to navigate the first vehicle along the respective updated route.

18. The method of claim 17, wherein identifying the first vehicle in the fleet of vehicles having the planned route near the high-risk situation during the time window is based on a geofenced area of the high-risk situation, wherein the geofenced area depends on the severity level.

19. The method of claim 17, wherein the high-risk situation is moving and the location of the high-risk situation is changing, and wherein receiving the vehicle event log includes receiving a direction of travel of the high-risk situation and a speed of travel of the high-risk situation.

20. The method of claim 17, further comprising communicating the respective updated route from the dispatch service to the first vehicle.

* * * * *